US011562233B2

(12) United States Patent
Katoh et al.

(10) Patent No.: US 11,562,233 B2
(45) Date of Patent: Jan. 24, 2023

(54) LEARNING METHOD, NON-TRANSITORY COMPUTER READABLE RECORDING MEDIUM, AND LEARNING DEVICE

(71) Applicant: FUJITSU LIMITED, Kawasaki (JP)

(72) Inventors: Takashi Katoh, Kawasaki (JP); Kento Uemura, Kawasaki (JP); Suguru Yasutomi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 441 days.

(21) Appl. No.: 16/742,033

(22) Filed: Jan. 14, 2020

(65) Prior Publication Data
US 2020/0234122 A1    Jul. 23, 2020

(30) Foreign Application Priority Data

Jan. 17, 2019 (JP) .............................. JP2019-006133

(51) Int. Cl.
*G06N 3/08*    (2006.01)
*G06N 3/04*    (2006.01)
(52) U.S. Cl.
CPC ............. *G06N 3/08* (2013.01); *G06N 3/0454* (2013.01)
(58) Field of Classification Search
CPC .............................. G06N 3/08; G06N 3/0454
See application file for complete search history.

(56) References Cited

U.S. PATENT DOCUMENTS

| 10,430,946 | B1 * | 10/2019 | Zhou | G06T 7/11 |
| 2019/0057509 | A1 * | 2/2019 | Lv | G06T 7/90 |
| 2019/0122101 | A1 * | 4/2019 | Lei | G06F 17/16 |
| 2019/0274108 | A1 * | 9/2019 | O'Shea | G06N 3/0472 |
| 2020/0027567 | A1 * | 1/2020 | Xie | G06K 9/6249 |

OTHER PUBLICATIONS

Utako Yamamoto et al., "Deformation estimation of an elastic object by partial observation using a neural network", arXiv:1711.10157v1 [cs.CV], Nov. 28, 2017.
Tolga Tasdizen et al., "Appearance invariance in convolutional networks with neighborhood similarity", arXiv:1707.00755v1 [cs.CV], Jul. 3, 2017.
Grigorios G. Chrysos et al., "Visual Data Augmentation through Learning", arXiv:1801.06665v1 [cs.CV], Jan. 20, 2018.
Baruch Epstein et al., "Joint auto-encoders: a flexible multi-task learning framework", arXiv:1705.10494v1 [stat.ML], May 30, 2017.

(Continued)

*Primary Examiner* — David Bilodeau
(74) *Attorney, Agent, or Firm* — Fujitsu Patent Center (57) ABSTRACT

A learning device generates a first feature value and a second feature value by inputting original training data to a first neural network included in a learning model. The learning device learns at least one parameter of the learning model and a parameter of a decoder, reconstructing data inputted to the first neural network, such that reconstruction data outputted from the decoder by inputting the first feature value and the second feature value to the decoder becomes close to the original training data, and that outputted data that is outputted from a second neural network, included in the learning model by inputting the second feature value to the second neural network becomes close to correct data of the original training data.

12 Claims, 11 Drawing Sheets

(56) References Cited

OTHER PUBLICATIONS

Weihua Hu et al., "Learning Discrete Representations via Information Maximizing Self-Augmented Training", arXiv:1702.08720v3 [stat.ML], Jun. 14, 2017.
Matthias Meyer et al., "Unsupervised Feature Learning for Audio Analysis", arXiv:1712.03835v1 [cs.CV], Dec. 11, 2017.
Xinyue Zhu et al., "Emotion Classification with Data Augmentation Using Generative Adversarial Networks", arXiv:1711.00648V5 [cs.CV], Dec. 14, 2017.
Yu Su et al., "Cross-domain Semantic Parsing via Paraphrasing", arXiv:1704.05974v2 [cs.CL], Jul. 24, 2017.
EESR—Extended European Search Report for European Patent Application No. 20151932.9 dated Jun. 8, 2020.
Thomas Robert et al., "HybridNet: Classification and Reconstruction Cooperation for Semi-Supervised Learning", International Conference on Financial Cryptography and Data Security, Lecture Notes in Computer Science, Oct. 6, 2018, pp. 158-175, XP047488230.
Paul Angshuman et al., "Discriminative Autoencoder", 2018 25th IEEE International Conference on Image Processing (ICIP), IEEE, Oct. 7, 2018, pp. 3049-3053, XP033455033.

\* cited by examiner

| DATA NUMBER | TRAINING DATA | CORRECT LABEL |
|---|---|---|
| p001 | xP1 | yP1 |
| p002 | xP2 | yP2 |
| p003 | xP3 | yP3 |
| ... | ... | ... |

FIG.5

| DATA NUMBER | TRAINING DATA SUBJECTED TO DATA AUGMENTATION | CORRECT LABEL |
|---|---|---|
| p001 | xP1.1, xP1.2, xP1.3 | yP1 |
| p002 | xP2.1, xP2.2, xP2.3 | yP2 |
| p003 | xP3.1, xP3.2, xP3.3 | yP3 |
| ... | ... | ... |

FIG.6

| IDENTIFICATION INFORMATION | PARAMETER |
|---|---|
| FIRST NN | $\theta 1$ |
| SECOND NN | $\theta 2$ |
| DECODER | $\theta 3$ |
| ... | ... |

FIG.7

| DATA NUMBER | REFERENCE FEATURE VALUE | CORRECT LABEL |
|---|---|---|
| p001 | zP1 | yP1 |
| p002 | zP2 | yP2 |
| p003 | zP3 | yP3 |
| ... | ... | ... |

LEARNING METHOD, NON-TRANSITORY COMPUTER READABLE RECORDING MEDIUM, AND LEARNING DEVICE

CROSS-REFERENCE TO RELATED APPLICATION(S)

This application is based upon and claims the benefit of priority of the prior Japanese Patent Application No. 2019-006133, filed on Jan. 17, 2019, the entire contents of which are incorporated herein by reference.

FIELD

The embodiment discussed herein is related to a learning method, and the like.

BACKGROUND

When learning a deep learning model, an amount of training data (learning data) is a factor that significantly contributes to the performance, and it is preferable to have more training data. If training data is insufficient, and application data of a type absent in the training data is applied to a deep learning model learned with the training data, there is an increased possibility that an appropriate output result is not obtained, resulting in failure.

Moreover, at a business site in which customer data is handled, considering a risk of leakage of a contract or information, it is difficult to hold data of one customer for long time, or to reuse it for a task of another customer. Therefore, the training data can be insufficient.

When the training data is insufficient, data augmentation is generally performed. The data augmentation is to subject original training data to processing of noise addition, parallel shift, missing, and the like, and enables to enlarge the range of the training data to the range of application data.

There is a conventional technique in which an amount of data that can be used when newly learning a deep learning model is increased without holding original training data, by holding an intermediate feature value that is acquired by inputting the original training data into the deep learning model (for example, Utako Yamamoto, et al. "Deformation Estimation of an Elastic Object by Partial Observation Using a Neural Network").

Figure 12:
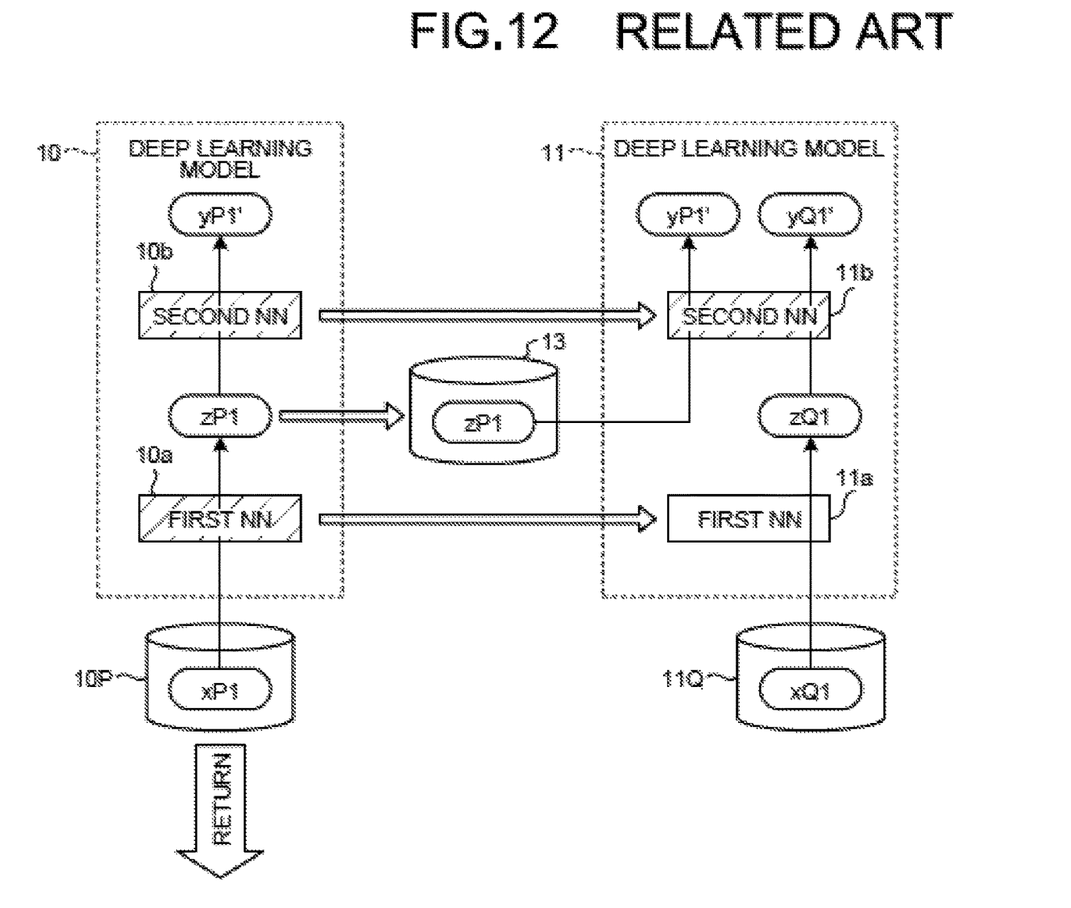
FIG. 12 is a diagram for describing a conventional technique.

FIG. 12 is a diagram for describing a conventional technique. In FIG. 12, a deep learning model 10 includes a first neural network (NN) 10a and a second NN 10b. The first NN 10a is an NN to calculate an intermediate feature value when training data is input. The second NN 10b is an NN to calculate an output label when the intermediate feature value is input. Parameters of the first NN 10a and the second NN 10b are supposed to have been learned by using multiple pieces of training data of a customer P stored in a database 10P. When learning is finished, information of the database 10P is returned to the customer P (or discarded).

For example, when training data xP1 is input to the first NN 10a, an intermediate feature value zP1 is calculated. When the intermediate feature value zP1 is input to the second NN 10b, an output label yP1' is calculated. In the conventional technique, before returning information of the database 10P, the intermediate feature value zP1 calculated from, the training data xP1 is stored in a database 13. In the conventional technique, an intermediate feature value that is calculated from another training data stored in the database 10P is also stored in the database 13.

Subsequently, in the conventional technique, by using a database 11Q in which multiple pieces of training data of a customer Q are stored and the database 13, a new deep learning model 11 is learned (incremental learning). The deep learning model 11 includes a first NN 11a and a second NN 11b. In the conventional technique, as a parameter of the first NN 11a, a learned parameter of the first. NN 10a is set. In the conventional technique, as a parameter of the second NN 11b, a learned parameter of the second NN 10b is set.

For example, when training data xQ1 of the database 11Q is input to the first NN 11a, an intermediate feature value zQ1 is calculated. When an intermediate feature value zQ1 is input to the second NN 11b, an output label yQ1' is calculated. In the conventional technique, a parameter of the second NN 11b is learned such that the output label yQ1' becomes closer to a correct label.

Furthermore, when the intermediate feature value zP1 of the database 13 is input to the second NN 11b, the output label yP1' is calculated. In the conventional technique, a parameter of the second NN 11b is learned such that the output label yP1' becomes closer to the correct label.

As described above, in the conventional technique, when learning a parameter of the second NN 1b, learning is performed by using the intermediate feature value of the database 13 in addition to the intermediate feature value calculated from the training data of the database 11Q. Therefore, even if the database 10P is returned (discarded) to the customer P, an amount of data that can be used when learning a new deep learning model can be increased.

In the conventional technique described in FIG. 12, there is a problem that it is difficult to avoid an intermediate feature value calculated by inputting training data to the pre-learned first NN 50a from being an intermediate feature value by an obvious solution.

Figure 13:
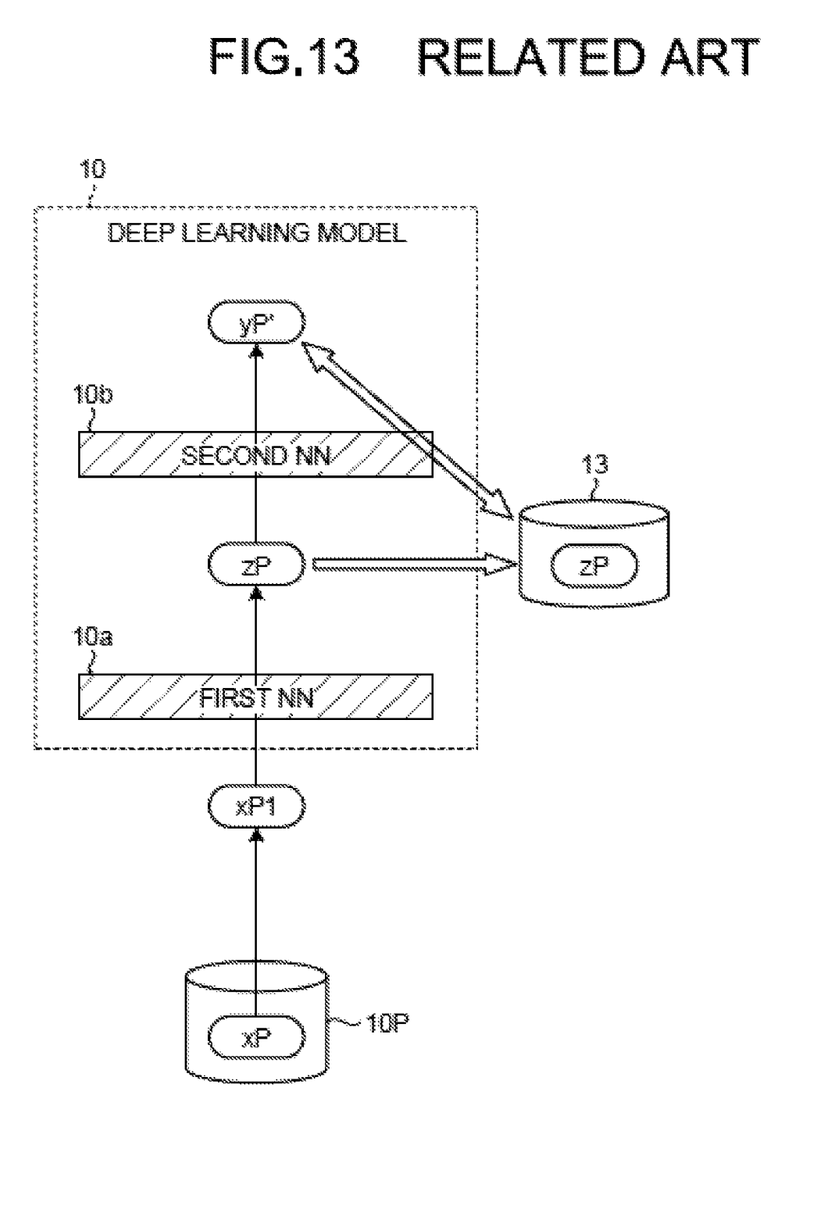
FIG. 13 is a diagram for describing a problem in the conventional technique.

FIG. 13 is a diagram for describing a problem in the conventional technique. For example, when the first NN 10a is redundant for a task, there is a possibility that an intermediate feature value zP calculated by inputting training data zP into the first NN 10a becomes an output label yP' itself. When the intermediate feature value zP is the output label yP' itself, an output label can be estimated only with the first NN 10a. In this case, the second NN 10b is to perform obvious mapping of outputting the output label yP' itself (the intermediate feature value zP itself) when the intermediate feature value zP is input. Consequently, the intermediate feature value zP stored in the database 13 indicates that information to perform incremental learning of the second NN is not stored, and the accuracy of the incremental learning at the second time and later is deteriorated.

SUMMARY

According to an aspect of an embodiment, a learning method includes generating a first feature value and a second feature value by inputting original training data to a first neural network included in a learning model; and learning at least one parameter of the learning model and a parameter of a decoder, reconstructing data inputted to the first neural network, such that reconstruction data outputted from the decoder by inputting the first feature value and the second feature value to the decoder becomes close to the original training data, and that outputted data that is outputted from a second neural network, included in the learning model by inputting the second feature value to the second neural network becomes close to correct data of the original training data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Preferred embodiments of the present invention will be explained with reference to accompanying drawings. Note that the embodiment is not intended to limit this invention.

[a] First Embodiment

Figure 1:
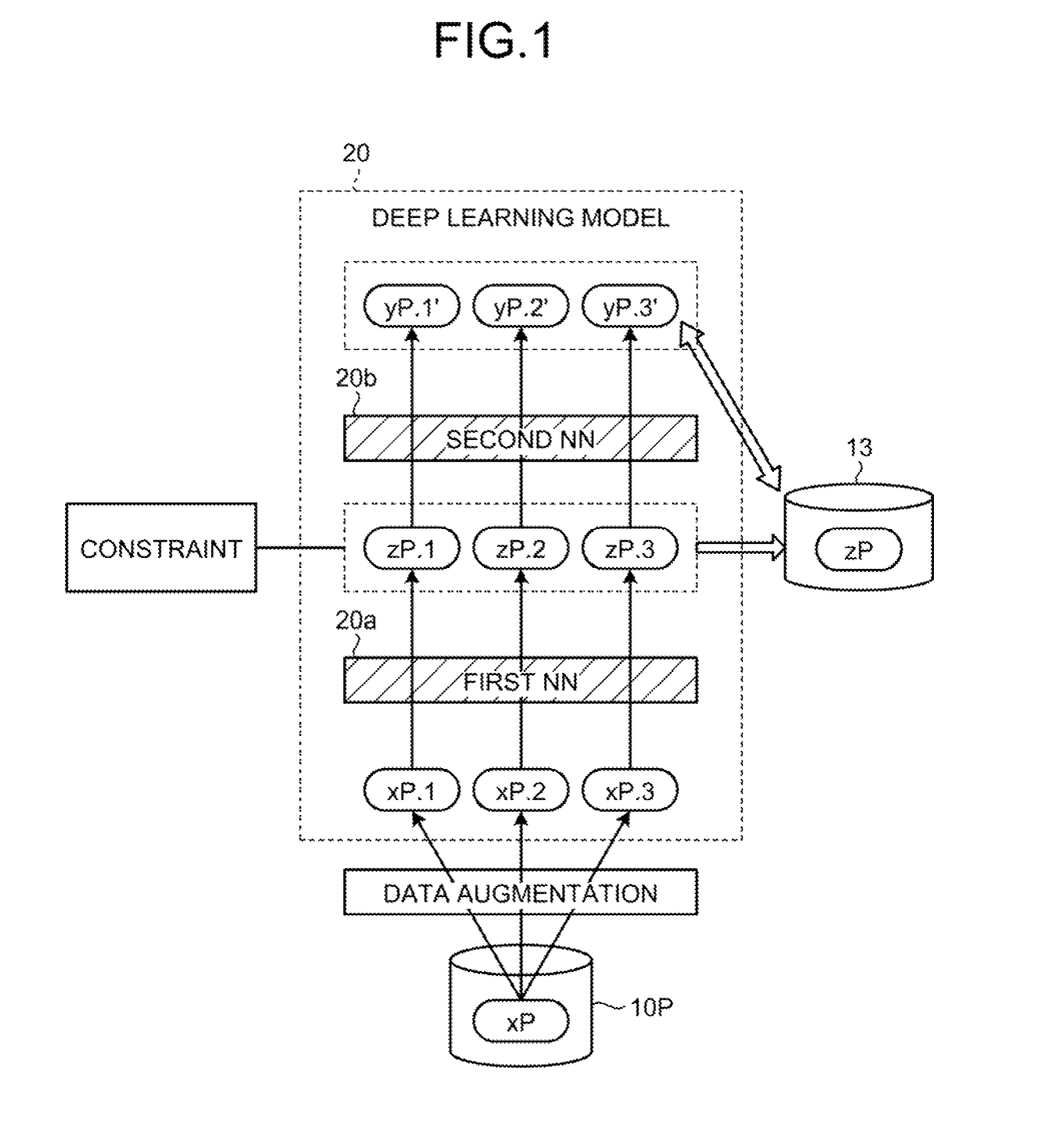
FIG. 1 is a diagram for describing an example of a reference technique.

Before describing a learning device according to the present embodiment, a reference technique will be described. FIG. 1 is a diagram fox describing an example of a reference technique. A deep learning model 20 to be learned includes a first NN 20a and a second NN 20b. The first NN 20a is an NN to calculate an intermediate feature value when training data is input. The second NN 20b is an NN to calculate an output label when the intermediate feature value is input. The database 10P stores original training data xP of the customer P. Moreover, a reference feature value zP corresponding to the training data xP is set.

In the reference technique, by performing data augmentation with respect to the training data xP, training data xP.1, xP.2, xP.3 are generated. The data augmentation is to subject the original training data to processing of noise addition, parallel shift, missing, and the like.

In the reference technique, the training data xP.1, xP.2, xP.3 are input to the first NN 20a, to calculate intermediate feature values zP.1, zP.2, zP.3. In the reference technique, the intermediate feature values zP.1, zP.2, zP.3 are input to the second NN 20b, to calculate output labels yP.1', yP.2', yP.3'. In the reference technique, learning of a parameter of the first NN 20a and a parameter of the second NN 20b are performed such that the output labels yP.1', yP.2', yP.3' become closer to respective correct labels.

Moreover, in the reference technique, giving a "constraint" that the intermediate feature values zP.1, zP.2, zP.3 become close to the reference feature value zP, learning of the parameter of the first NN 20a and the reference feature value zP is performed. IN the reference technique, the learned reference feature value zP is stored in the database 13. The reference feature value zP stored in the database 13 is used when learning of a deep learning model of another customer is newly performed.

As in the reference technique, by storing the reference feature value zP in which the respective intermediate feature values zP.1 to zP.3 are summarized instead, of storing the respective intermediate feature values zP.1, zP.2, zP.3 in the database 13, it becomes possible to reduce a data amount of the database 13. However, the reference feature value zP is information close to the output labels yP.1', yP.2', yP.3', compared with the intermediate feature value zP described in FIG. 12. That is, if a constraint to absorb a difference in data augmentation is added to the first NN 10a when data augmentation is performed, the reference feature value (the intermediate feature value) becomes further close to the output label. This is because the constraint can be easily satisfied if a portion of the second NN 10b is obvious mapping.

Therefore, in the reference technique also, similarly to the conventional technique, it is difficult to avoid the reference feature value from being an intermediate feature value by an obvious solution, and the learning accuracy is deteriorated in learning at the second time and later if the reference feature value is used.

Figure 2:
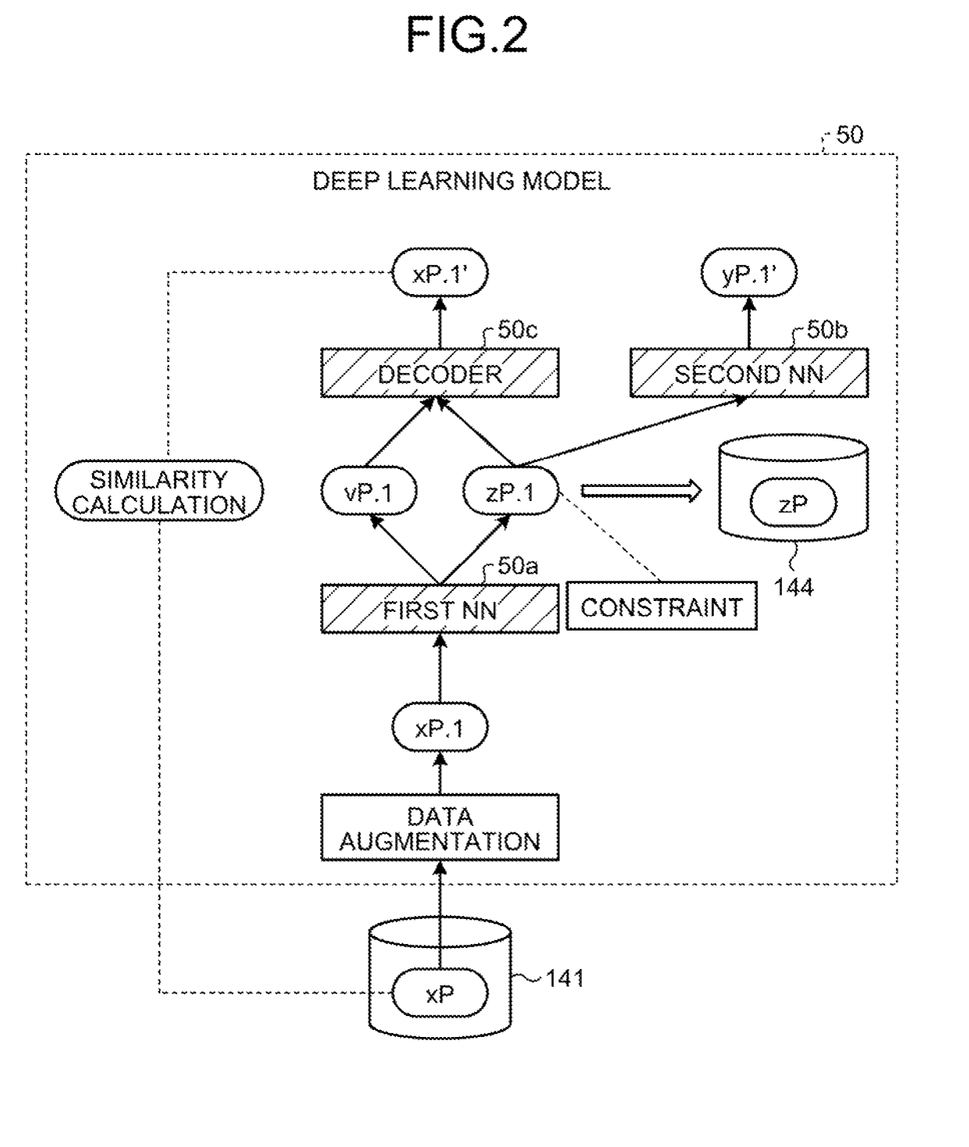
FIG. 2 is a diagram for describing processing of a learning device according to a present embodiment.

Next, an example of processing of the learning device according to the present embodiment will be described. FIG. 2 is a diagram for describing processing of the learning device according to the present embodiment. As illustrated in FIG. 2, a deep learning model 50 includes the first NN 50a, a second NN 50b, and a decoder 50c. In a learning database 141, the original training data xP is stored. In the learning database 141, another training data is stored.

The first NN 50a is an NN to calculate an intermediate feature value when training data is input. The intermediate feature value calculated by the first NN 50a includes a first feature value and a second feature value. For example, among output nodes included in an output layer of the first NN 50a, nodes that output the first feature value and nodes that output the second feature value are set in advance. The dimensionality of the first feature value is to be sufficiently small compared to the dimensionality of the second feature value.

The second NN 50b is a processing unit that calculates an output label when the second feature value is input. The decoder 50c is a processing unit that calculates reconstruction data when the first feature value and the second feature value are input.

The learning device performs data augmentation with respect to the original training data xP, to generate training data zP.1. When the learning device inputs the training data P.1 to the first NN 50a, a first feature value vP.1 and the second feature value zP.1 are output from the first NN 50a.

When the learning device inputs the second feature value zP.1 to the second NN 50b, the output label yP.1' is output from the second NN 50b. When the learning device inputs the first feature value vP.1 and the second feature value zP.1 to the decoder 50c, reconstruction data xP.1' is output.

The learning device learns the parameter of the first NN 50a and the parameter of the second NN 50b such that the output label yP.1' and the correct label of the original training data xP become close to each other. The learning device learns the parameter of the first NN 50a and the parameter of the decoder 50c such that the similarity between the reconstruction data zP.1' and the training data xP increases. Moreover, the reference feature value zP and the parameter of the first NN 50a are learned such that the second feature value zP.1 satisfies a constraint. For example, the constraint is such a constraint that the similarity between the second feature value calculated from multiple pieces of training data that are obtained by data augmentation of the same original training data and the reference feature value zP increases. The learning device stores the learned reference feature value zP in a reference feature-value database 144, and uses it in learning at the second time and later.

The decoder 50c is to reconstruct original training data (for example, xP.1) based on the first feature value and the second feature value, and feature information of the original training data is stored in the first feature value and the second feature value in a distributed manner. Because the dimensionality of the first feature value is set to be small, the feature information of the original training data is stored more in the second feature value than in the first feature value. Because there is a constraint for the feature information stored in the second feature value, feature information not satisfying the constraint is stored in the first feature value. Thus, a most part of the feature information to perform reconstruction remains in the second feature value, and it is possible to avoid it from being an obvious feature (the second feature value being information close to the output label itself).

That is, by performing the learning of respective parameters by the learning device by dividing an intermediate feature value output from the first NN 50a into the first feature value and the second feature value, a most part of information that satisfies the constraint and that is originally intended to be saved out of the training data can be held in the second feature value (reference feature value) remaining therein.

Figure 3:
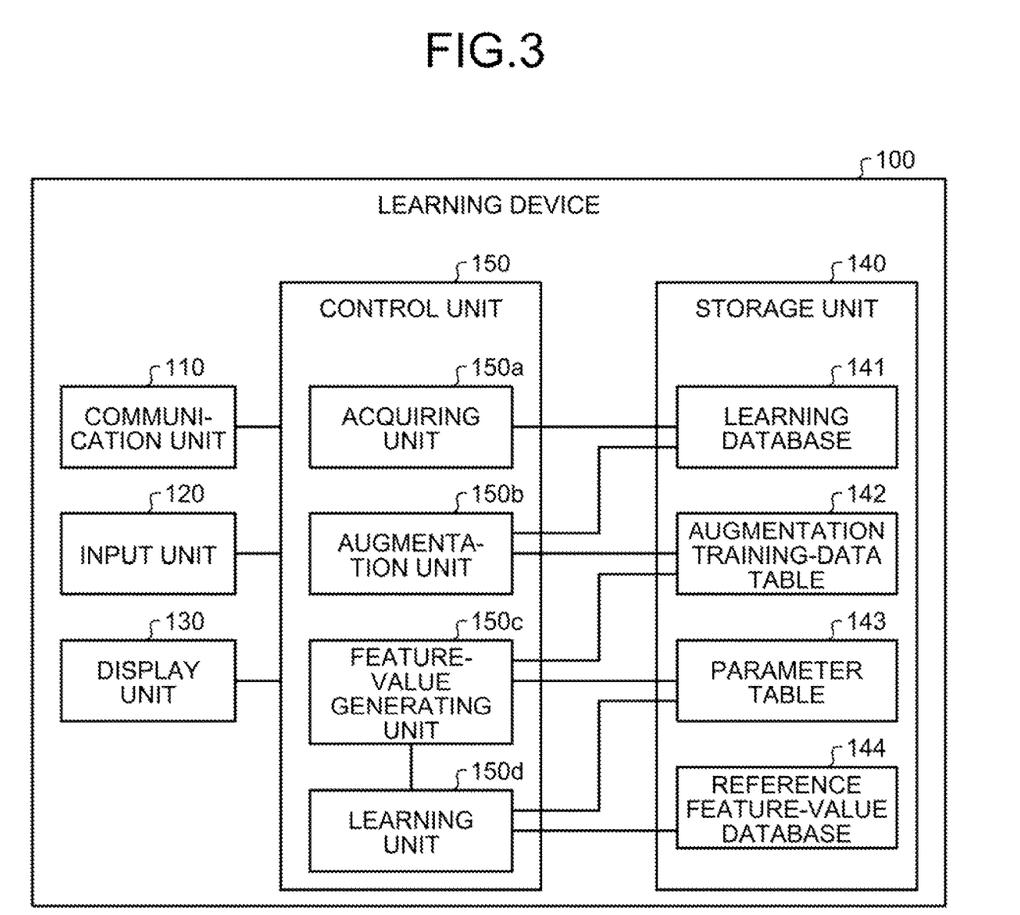
FIG. 3 is a functional block diagram illustrating a configuration of the learning device according to the present embodiment.

Next, an example of a configuration of the learning device according to the present embodiment will be described. FIG. 3 is a functional block diagram illustrating a configuration of the learning device according to the present embodiment. As illustrated in FIG. 3, this learning device 100 includes a communication unit 110, an input unit 120, a display unit 130, a storage unit 140, and a control unit 150.

The communication unit 110 is a processing unit that performs data communication with an external device through a network, and the like. The communication unit 110 corresponds to a communication device. For example, the communication unit 110 receives information of the learning database 141 described later from an external device of each customer, or the like. The control unit 150 described later communicates data with an external device through the communication unit 110.

The input unit 120 is an input device to input various kinds of information to the learning device 100. For example, the input unit 120 corresponds to a keyboard, a mouse, a touch panel, and the like.

The display unit 130 is a display device that displays various kinds of information output from the control unit 150. For example, the display unit 130 corresponds to a liquid crystal display, a touch panel, and the like.

The storage unit 140 includes the learning database 141, an augmentation training-data table 142, a parameter table 143, and the reference feature-value database 144. The storage unit 140 corresponds to a semiconductor memory device, such as a random-access memory (RAM), a read-only memory (ROM), and a flash memory, and a storage device, such as a hard disk drive (HDD).

Figure 4:
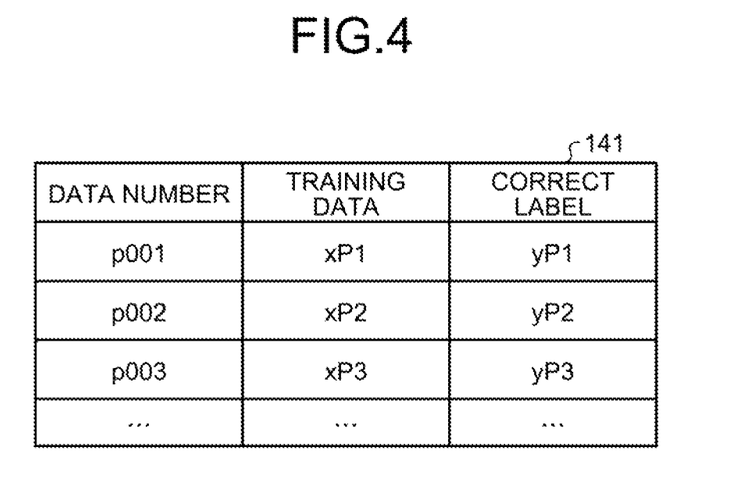
FIG. 4 is a diagram illustrating an example of a data structure of a learning database according to the present embodiment.

The learning database 141 stores information of training data given by each customer. FIG. 4 is a diagram illustrating an example of a data structure of the learning database according to the present embodiment. As illustrated in FIG. 4, this learning database 141 associates a data number, training data, and a correct label with one another. The data number is a number to uniquely identify original training data. For example, a correct label corresponding to the training data "xP1" is "yP1", and the data number of the training data "xP1" is "p001".

Figure 5:
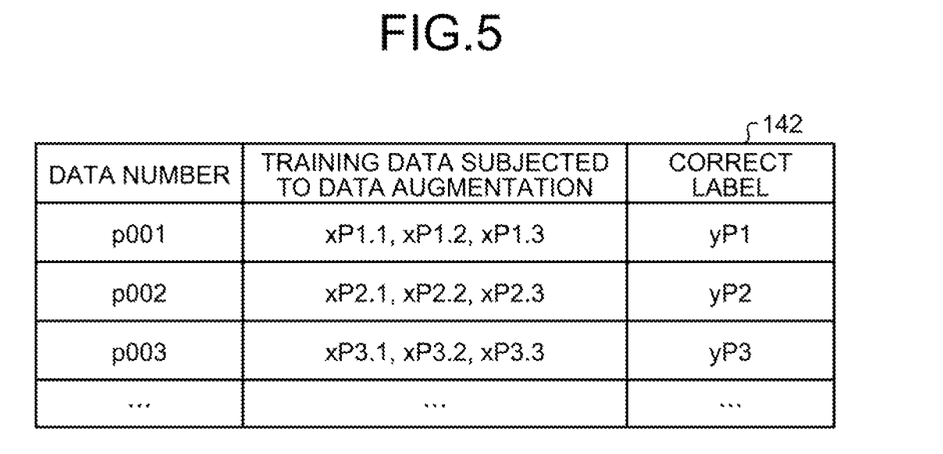
FIG. 5 is a diagram illustrating an example of a data structure of an augmentation training-data table according to the present embodiment.

The augmentation training-data table 142 is a table that holds training data obtained by data augmentation based on the original training data. FIG. 5 is a diagram illustrating an example of a data structure of an augmentation training-data table according to the present embodiment. As illustrated in FIG. 5, this augmentation training-data table 142 associates a data number, training data subjected to data augmentation, and a correct label, with one another. The data number is a number to uniquely identify original training data to be a source of the data augmentation. The correct label corresponding to the training data subjected to data augmentation is to be a correct label that is associated with original training data corresponding to the data number.

Figure 6:
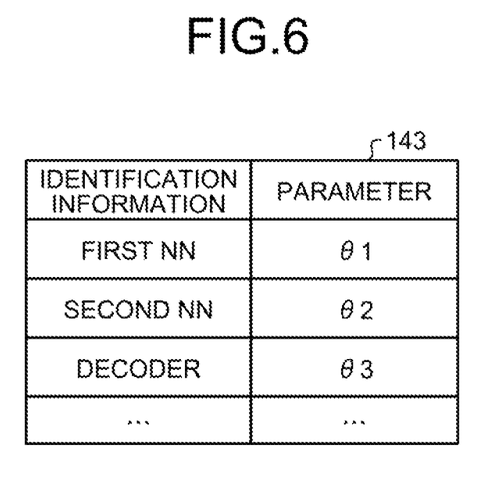
FIG. 6 is a diagram illustrating an example of a data structure of a parameter table according to the present embodiment.

The parameter table 143 is a table that stores the parameter of the first NN 50a, the parameter of the second NN 50b, and the parameter of the decoder 50c. FIG. 6 is a diagram illustrating an example of a data structure of the parameter table according to the present embodiment. As illustrated in FIG. 6, the parameter table 143 associate's identification information and a parameter with each other. The identification information is information to identify respective NNs, and a decoder. The parameter is a parameter set to the respective NNs. The NN has multiple layers, and has a structure in which each layer includes multiple nodes, and the respective nodes are connected by edges. Each layer has a function called activation function and a bias value, and the edge has a weight. The decoder also has multiple layers similarly to the NN, and has a structure in which each layer includes multiple nodes, and respective nodes are connected by edges. In the present embodiment, the bias value, the weight, and the like set to the NN and the decoder are collectively referred to as "parameter".

Figure 7:
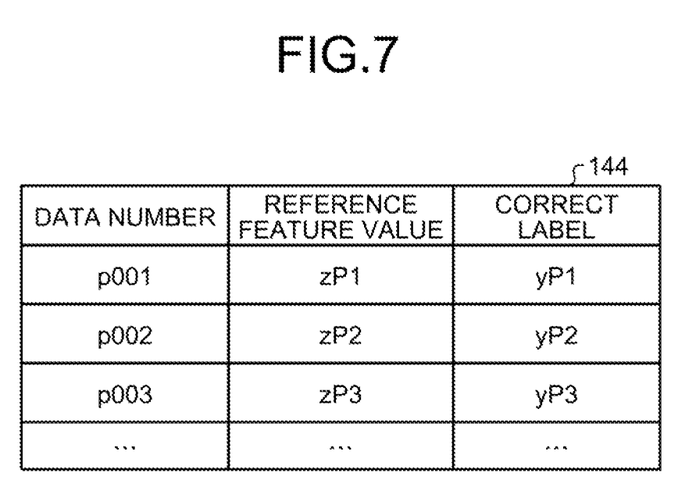
FIG. 7 is a diagram illustrating an example of a data structure of a reference feature-value database according to the present embodiment.

The reference feature-value database 144 is a database that stores reference feature values set to the respective original training data. FIG. 7 is a diagram illustrating an example of a data structure of the reference feature-value database according to the present embodiment. As illustrated in FIG. 7, the reference feature-value database 144 associates a data number, a reference feature value, and a correct label with one another. The data number is a number to uniquely identify original training data. An initial value of the reference feature value is set in advance. The correct label is to be a correct label of the original training data corresponding to the data number.

Returning back to description of FIG. 3, the control unit 150 includes an acquiring unit 150a, an augmentation unit 150b, a feature-value generating unit 150c, and a learning unit 150d. The control unit 150 can be implemented by a central processing unit (CPU), a micro processing unit (MPU), and the like. Moreover, the control unit 150 can be implemented by a hardwired logic, such as an application specific integrated circuit (ASIC) and a field programmable gate array (FPGA).

The acquiring unit 150a is a processing unit that acquires information of the learning database 141 from an external device of each customer, or the like. The acquiring unit 150a stores the required information of the learning database 141 in the learning database 141.

The augmentation unit 150b is a processing unit that performs data augmentation with respect to the original training data stored in the learning database 141, to generate multiple pieces of training data. For example, the data augmentation performed by the augmentation unit 150b corresponds to processing of noise addition, parallel shift, missing, and the like with respect to the training data.

The augmentation unit 150b stores a data number of original training data, training data subjected to the data augmentation, and a correct label corresponding to the original training data in the augmentation training-data table 142, associating with one another. The augmentation unit 150b repeats the above processing with respect to the respective training data stored in the learning database 141.

Figure 8:
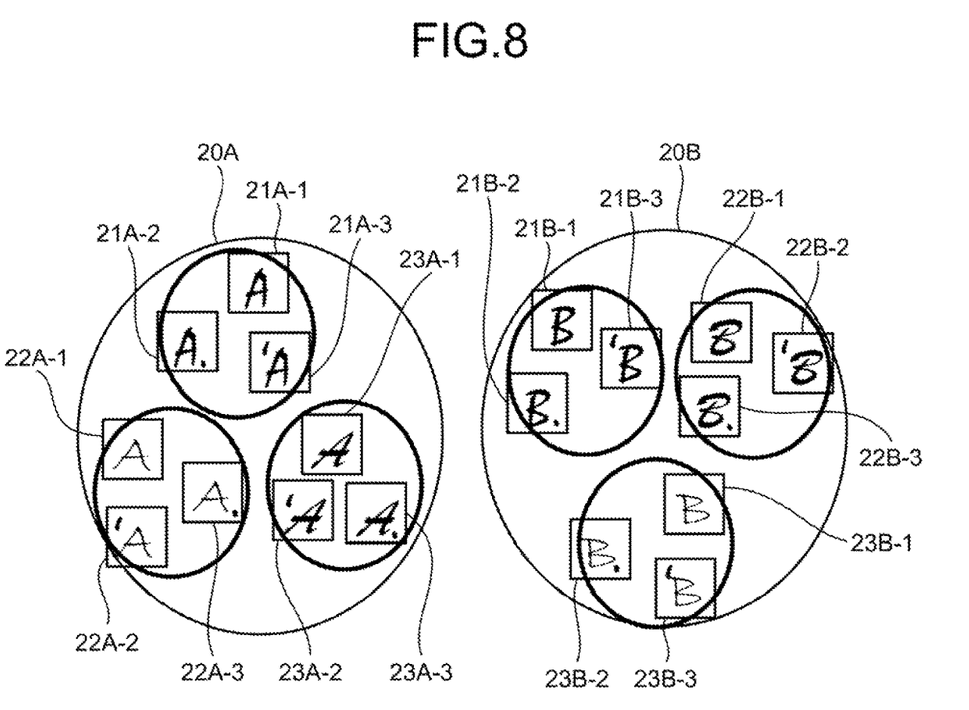
FIG. 8 is a diagram for describing an example of data augmentation.

FIG. 8 is a diagram for describing an example of the data augmentation. In the example in FIG. 8, a training data group 20A includes training data 21A-1 to 21A-3, training data 22A-1 to 22A-3, and training data 23A-1 to 23A-3. For example, with the training data group 20A, a correct label "A" is associated.

The training data 21A-2, 21A-3 are data that are acquired by subjecting the original training data 21A-1 to data augmentation. The training data 22A-2, 22A-3 are data that are acquired by subjecting the original training data 22A-1 to data augmentation. The training data 23A-2, 23A-3 are data that are acquired by subjecting the original training data 23A-1 to data augmentation.

A training data group 20B includes training data 21B-1 to 21B-3, training data 22B-1 to 22B-3, and training data 23B-1 to 23B-3. For example, with the training data group 20A, a correct label "B" is associated.

The training data 21B-2, 21B-3 are data that are acquired by subjecting the original training data 21B-1 to data augmentation. The training data 22B-2, 22B-3 are data that are acquired by subjecting the original training data 22B-1 to data augmentation. The training data 233-2, 23B-3 are data that are acquired by subjecting the original training data 23B-1 to data augmentation.

When it is explained using FIG. 8 as an example, the augmentation unit 150b performs data augmentation with respect to the training data 21A-X, to generate the training data 21A-2, 21A-3.

The feature-value generating unit 150c is a processing unit that inputs multiple pieces of training data subjected to data augmentation to the first NN 50a, to generate the first feature value and the second feature value for each training data. In the following, an example of processing of the feature-value generating unit 150c will be described.

The feature-value generating unit 150c performs the first NN 50a, and sets a parameter $\theta 1$ stored in the parameter table 143 as a parameter of the first NN 50a. Suppose that a node that outputs the first feature value and a node that outputs the second feature value out of output nodes included in the output layer of the first NN 50a are set in advance. The dimensionality of the first feature value is sufficiently small compared to the dimensionality of the second feature value.

The feature-value generating unit 150c acquires a data number, and multiple pieces of training data that are associated with the data number from the augmentation training-data table 142, and inputs the acquired multiple pieces of training data sequentially to the first NN 50a. The feature-value generating unit 150c calculates the first feature value and the second feature value of the respective pieces of training data by using the parameter $\propto 1$ set to the first NN 50a.

The feature-value generating unit 150c outputs the data number, the first feature value, and the second feature value to the learning unit 150d. The feature-value generating unit 150c repeats the above processing with respect to respective records in the augmentation training-data table 142.

The learning unit 150d is a processing unit that learns the parameter $\theta 1$ of the first NN 50a, a parameter $\theta 2$ of the second NN 50b, a parameter $\theta 3$ of the decoder 50c, and a reference feature value by using the error back propagation method, or the like.

Figure 9:
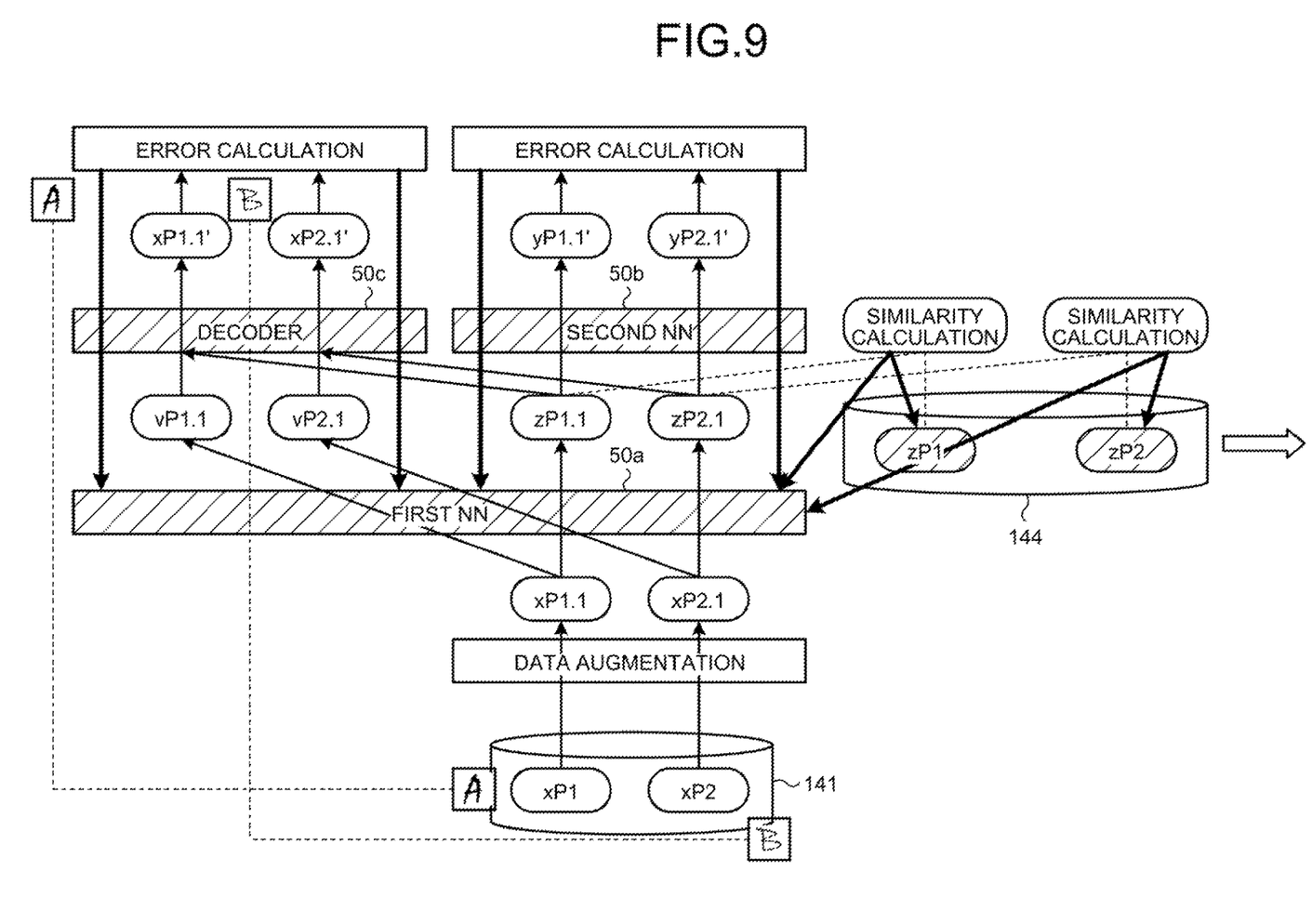
FIG. 9 is a diagram for describing processing of a learning unit according to the present embodiment.

FIG. 9 is a diagram for describing processing of the learning unit according to the present embodiment. The learning unit 150d performs the first NN 50a, the second NN 50b, and the decoder 50c. The learning unit 150d sets the parameter $\theta 2$ to the second NN 50b, and sets the parameter $\theta 3$ to the decoder 50c.

For example, as the original training data xP1 stored in the learning database 141 is subjected to data augmentation, the training data xP1.1 is generated. As the original training data xP2 stored in the learning database 141 is subjected to data augmentation, the training data xP1.2 is generated. As the training data xP1.1 is input to the first NN 50a, the first feature value vP1.1 and the second feature value zP1.1 are generated. As the training data xP2.1 is input to the first NN 50a, the first feature value vP2.1 and the second feature value zP2.1 are generated. A reference feature value corresponding to the training data xP1 is zP1. A reference feature value corresponding to the training data xP2 is zP2. Although not illustrated in the drawings, a correct label of the training data xP1 is "yP1". A correct label of the training data xP2 is "yP2".

The learning unit 150d acquires the first feature value vP1.1 and the second feature value zP1.1 from the feature-value generating unit 150c, and identifies the corresponding reference feature value zP1, using the data number as a key. The learning unit 150d acquires the first feature value vP2.1 and the second feature value zP2.1 from the feature-value generating unit 150c, and identifies the reference feature value zP2, using the data number as a key.

The learning unit 150d inputs the second feature value zP1.1 to the second NN 50b, and calculates the output label yP1.1' based on the parameter $\theta 2$. The learning unit 150d inputs the second feature value zP2.1 to the second NN 50b, and calculates the output label yP2.1' based on the parameter $\theta 2$. The learning unit 150d calculates an error between the output label yP1.1' and the correct label yP1. The learning unit 150d calculates an error between the output label yP2.1' and the correct label yP2. The learning unit 150d learns the parameters $\theta 1$ and $\theta 2$ such that the error becomes small.

The learning unit 150d inputs the first feature value vP1.1 and the second feature value zP1.1 to the decoder 50c, and calculates reconstruction data xP1.1' based on the parameter $\theta 3$. The learning unit 150d calculates the similarity between the reconstruction data xP1.1' and the training data xP1, and learns the parameters θ1, θ3 such that the similarity increases. The learning unit 150d inputs the first feature value vP2.1 and the second feature value zP2.1 to the decoder 50c, and calculates reconstruction data xP2.1' based on the parameter θ3. The learning unit 150d calculates the similarity between the reconstruction data xP2.1' and the training data xP2, and learns the parameters θ1, θ3 such that the similarity increases.

The learning unit 150d calculates the similarity between the second feature value zP1.1 and the reference feature value zP1, and learns the reference feature value zP1 and the parameters θ1 such that the similarity increases. The learning unit 150d calculates the similarity between the second feature value zP2.1 and the reference feature value zP2, and learns the reference feature value zP2 and the parameters θ1 such that the similarity increases.

That is, the learning unit 150d repeatedly perform processing of learning the parameters θ1 to θ3, and the reference feature value such that the error between the output label and the correct label becomes small, that the similarity between the reconstruction data and the original training data increases, and that the similarity between the reference feature value and the second feature value increases. The learning unit 150d stores the learned parameters θ1 to θ3 in the parameter table 143. The learning unit 150d stores the learned reference feature value of the respective training data in the reference feature-value database 144, associating with the correct label.

The reference feature value registered in the reference feature-value database 144 is used for learning of the second NN at the second time and later. For example, the learning unit 150d inputs the reference feature value to the second NN, and learns the parameter θ2 of the second NN such that the output label output from the second NN becomes close to the correct label associated with the reference feature value.

The learning unit 150d may calculate the similarity between the reconstruction data and the training data in any way. For example, the learning unit 150d may calculate a square error between the reconstruction data and the training data, and may use a value of the square error as the similarity. In this case, the smaller the value of the square error is, the higher the similarity becomes.

Similarly, the learning unit 150d may calculate the similarity between the second feature value and the reference feature value in any way. For example, the learning unit 150d may calculate a square error between the second feature value and the reference feature value, and may use a value of the square error as the similarity. In this case, the smaller the value of the square error is, the higher the similarity becomes.

Figure 10:
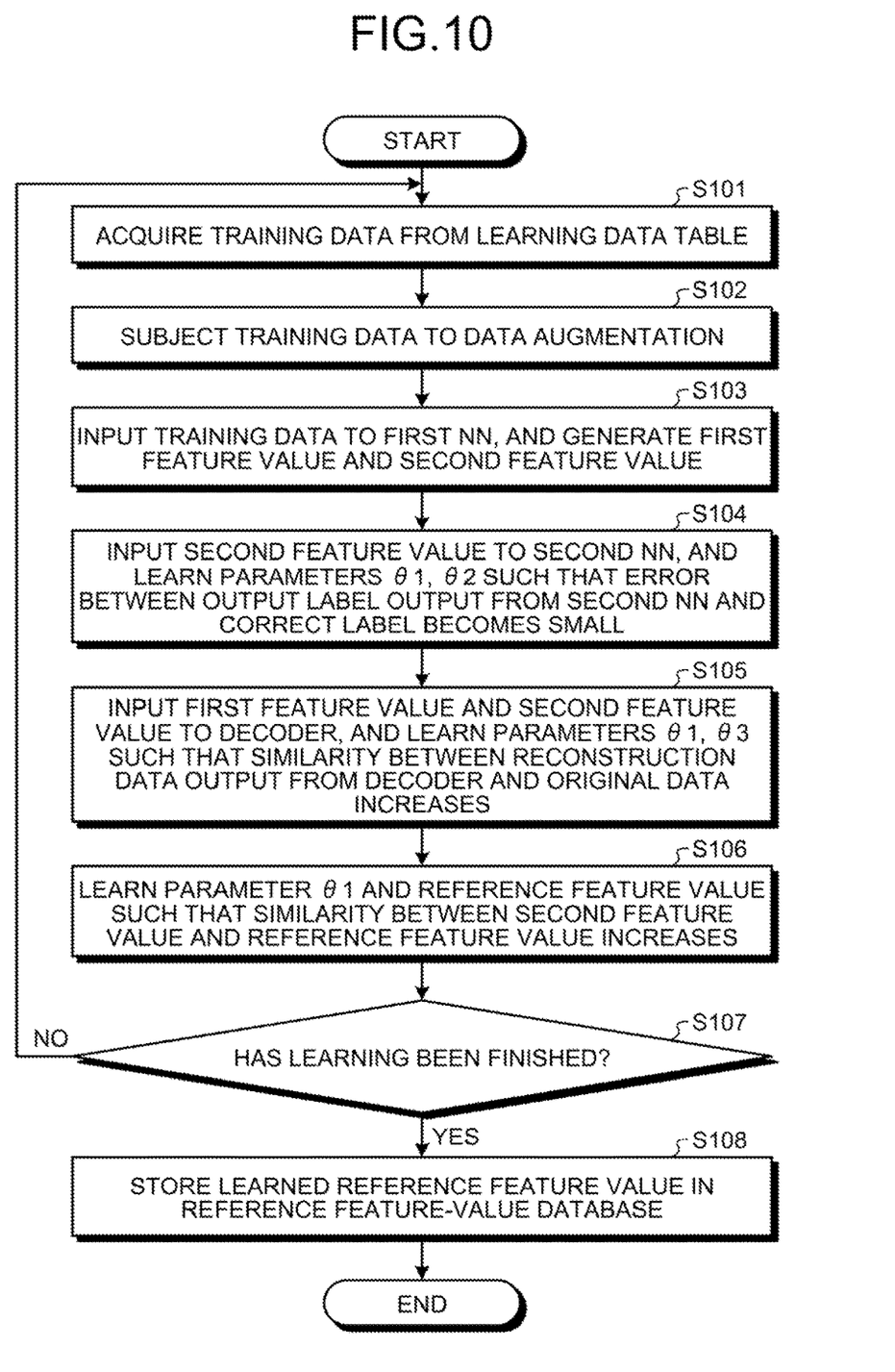
FIG. 10 is a flowchart illustrating a procedure of processing performed by the learning device according to the present embodiment.

Next, an example of a procedure of processing performed by the learning device 100 according to the present embodiment will be described. FIG. 10 is a flowchart illustrating a procedure of processing performed by the learning device according to the present embodiment. As illustrated in FIG. 10, the augmentation unit 150b of the learning device 100 acquires training data from the learning database 141 (step S101). The augmentation unit 150b subjects the training data to data augmentation (step S102).

The feature-value generating unit 150c of the learning device 100 inputs the training data to the first NN 50a, to generate the first feature value and the second feature value (step S103). The learning unit 150d of the learning device 100 inputs the second feature value to the second NN 50b, and learns the parameters θ1, θ2 such that the error between an output label output from the second NN 50b and the correct label becomes small (step S104).

The learning unit 150d inputs the first feature value and the second feature value to the decoder 50c and learns the parameters θ1, θ3 such that the similarity between reconstruction data output from the decoder 50c and the original training data increases (step S105).

The learning unit 150d learns the parameter θ1 and the reference feature value such that the similarity between the second feature value and the reference feature value increases (step S106). The learning unit 150d shifts to step S101 when learning has not been finished (step S107" NO).

On the other hand, when the learning has been finished (step S107: YES), the learning unit 150d stores the learned reference feature value in the reference feature-value database 144 (step S108).

Next, an effect of the learning device 100 according to the present embodiment will be described. The learning device 100 divides an intermediate feature value output from the first NN 50a into the first feature value and the second feature value, and learns the parameters θ1, θ2 such that an output label calculated by inputting the second feature value to the second NN 50b becomes close to the correct label. The learning device 100 learns the parameters θ1, θ3 such that reconstruction data calculated by inputting the first feature value and the second feature value to the decoder 50c becomes similar to the training data. Moreover, the learning device 100 learns the parameter θ1 and the reference feature value such that the second feature value satisfies the constraint.

Because the decoder 50c is to reconstruct the original training data (for example, xP in FIG. 2) based on the first feature value and the second feature value, the feature information of the training data xP is stored, distributed to the first feature value and the second feature value. Because the dimensionality of the first feature value is set to be small, the feature information of the original training data is stored more in the second feature value than in the first feature value. As there is a constraint for the feature information to be stored in the second feature value, feature information not satisfying the constraint is stored, in the first feature value. Thus, a most part of the feature information to perform reconstruction is held in the second feature value remaining therein, and it is possible to avoid it from being an obvious feature (the second feature value being information close to the output label itself).

In the reference feature value in the reference feature-value database 144, a most part of the feature information of the training data remains, and is to be information effective information as a feature value stored at the time of incremental learning. Therefore, when learning is performed at the second time or later by using the reference feature value, incremental learning of the second NN can be accurately performed.

The learning device 100 generates multiple pieces of training data that are obtained by subjecting the original training data to data augmentation, and learns the reference feature value and the parameter θ1 of the first NN 50a such that the second feature value calculated when the multiple pieces of training data are input to the first NN 50a becomes similar to the reference feature value. Thus, the reference feature value in which multiple pieces of the second feature values are summarized can be stored in the reference feature-value database 144.

Furthermore, the learning device 100 stores the reference feature value and the correct label, corresponding to the original training data in the reference feature-value database 144, associating with each other. The learning device 100 learns the parameter θ2 of the second NN 50b such that an output label when the reference feature value is input to the second NN becomes close to the correct label corresponding to the reference feature value. Thus, by using the reference feature-value database 144, an amount of data that can be used in incremental learning at the second time and later can be increased, and the learning accuracy can be improved.

Figure 11:
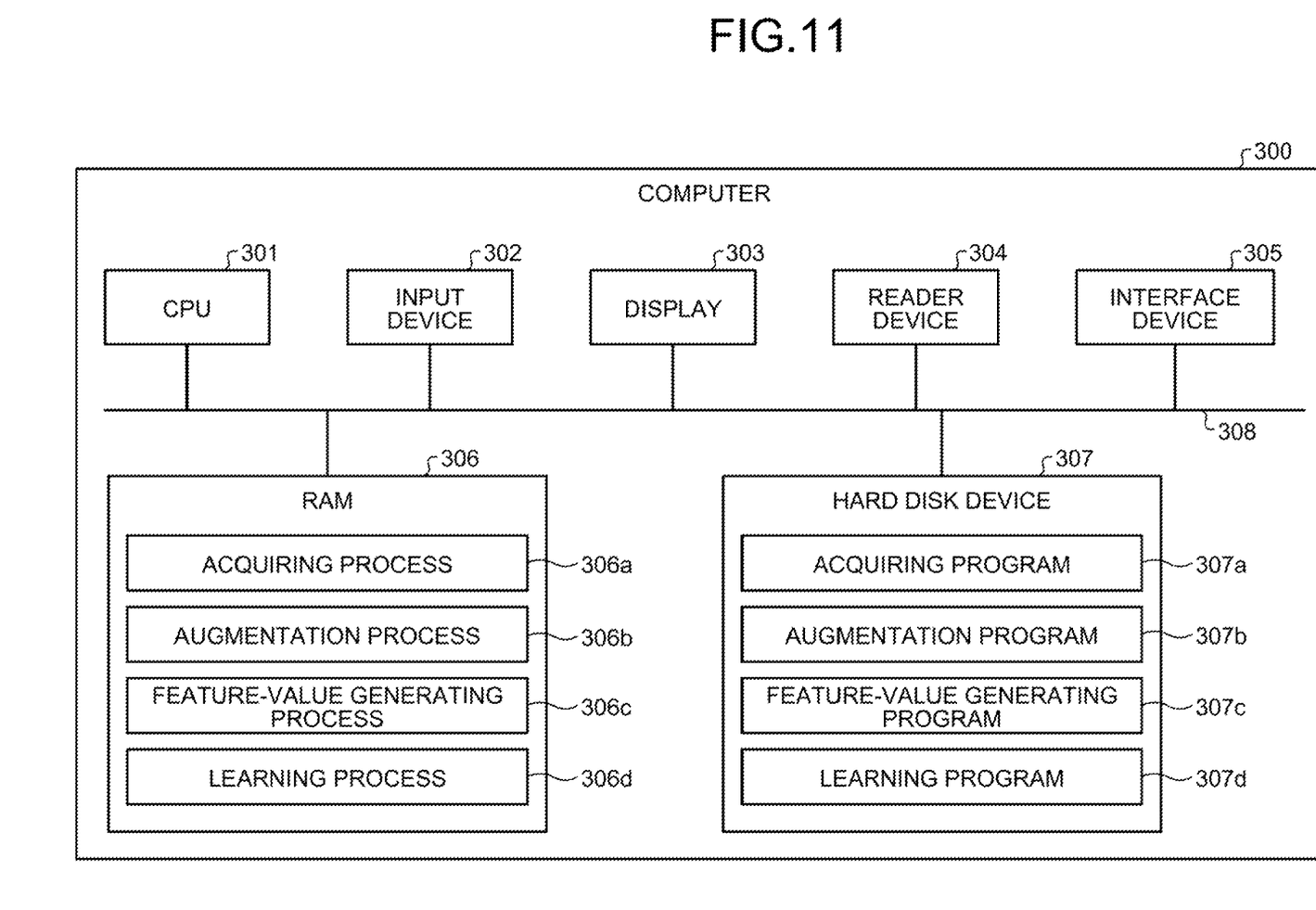
FIG. 11 is a diagram illustrating an example of a hardware configuration of a computer that implements functions similar to the learning device according to the present embodiment.

Next, an example of a hardware configuration of a computer that implements functions similar to the learning device 100 according to the present embodiment will be described. FIG. 11 is a diagram illustrating an example of a hardware configuration of the computer that implements functions similar to the learning device according to the present embodiment.

As illustrated in FIG. 11, a computer 300 includes a CPU 301 that performs various kinds of arithmetic processing, an input device 302 that accepts an input of data from a user, and a display 303. Moreover, the computer 300 includes a reader device 304 that reads a program and the like from a recording medium, and an interface device 305 that communicates data with an external device, or the like through a wired or wireless network. The computer 300 includes a RAM 306 that temporarily stores various kinds of information, and a hard disk device 307. The respective devices 301 to 307 are connected to a bus 303.

The hard disk device 307 includes an acquiring program 307a, an augmentation program 307b, a feature-value generating program 307c, and a learning program 307d. The CPU 301 reads the acquiring program 307a, the augmentation program 307b, the feature-value generating program 307c, and the learning program 307d, and develops them on the RAM 306.

The acquiring program 307a functions as an acquiring process 306a. The augmentation program 307b functions as an augmentation process 306b. The feature-value generating program 307c functions as a feature-value generating process 306c. The learning program 307d functions as a learning process 306d.

Processing of the acquiring process 306a corresponds to the processing of the acquiring unit 150a. Processing of the augmentation process 306b corresponds to the processing of the augmentation unit 150b. Processing of the feature-value generating process 306c corresponds to the processing of the feature-value generating unit 150c. Processing of the learning process 306d corresponds to the processing of the learning unit 150d.

Mote that the respective programs 307a to 307d are not necessarily stored in the hard disk device 307 from the beginning. For example, the respective programs are stored in a "portable physical medium", such as a flexible disk (FD), a compact-disk read-only memory (CD-ROM), a digital versatile disk (DVD), a magneto-optical disk, and an integrated circuit (IC) card. The computer 300 may be configured to read and execute the respective programs 307a to 307d.

It is possible to improve the accuracy of incremental learning in which an intermediate feature value generated from training data is succeeded.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A learning method, executed by a computer, the learning method comprising:
    generating a first feature value and a second feature value by inputting original training data to a first neural network included in a learning model; and
    learning a parameter of the first neural network, a parameter of a second neural network included in the learning model, a parameter of a decoder that inputs thereto the first feature value and the second feature value and reconstructs reconstruction data, and a reference feature value stored in a storage device, based on:
    an error between the reconstruction data and the original training data,
    an error between outputted data that is outputted from the second neural network that inputs thereto the second feature value and correct data of the original training data, and
    an error between the second feature value and the reference feature value, wherein the reference feature value is used for learning the parameter of the second neural network when another training data is used for the learning model.

2. The learning method according to claim 1, wherein the learning learns the reference feature value and the parameter of the first neural network based on an error between each of second feature values and the reference feature value, the second feature values are calculated by inputting a plurality of pieces of augmentation training data to the first neural network, and the plurality of pieces of augmentation training data is obtained by data augmentation of the original training data.

3. The learning method according to claim 2, further comprising
    performing processing of storing the reference feature value and the correct data of the original training data in the storage device, associating with each other.

4. The learning method according to claim 3, wherein
    the learning learns a parameter of the second neural network based on an error between output data and correct data corresponding to the reference feature value, and the output data is output from the second neural network by inputting the reference feature value stored in the storage device to the second neural network.

5. A non-transitory computer readable storage medium having stored therein a program that causes a computer to execute a process including:
    generating a first feature value and a second feature value by inputting original training data to a first neural network included in a learning model; and
    learning a parameter of the first neural network, a parameter of a second neural network included in the learning model, a parameter of a decoder that inputs thereto the first feature value and the second feature value and reconstructs reconstruction data, and a reference feature value stored in a storage device, based on:
    an error between the reconstruction data and the original training data,
    an error between outputted data that is outputted from the second neural network that inputs thereto the second feature value and correct data of the original training data, and an error between the second feature value and the reference feature value, wherein the reference feature value is used for learning the parameter of the second neural network when another training data is used for the learning model.

6. The non-transitory computer readable storage medium according to claim 5, wherein the learning learns the reference feature value and the parameter of the first neural network based on an error between each of second feature and the reference feature value, the second feature values are calculated by inputting a plurality of pieces of augmentation training data to the first neural network, and the plurality of pieces of augmentation training data is obtained by data augmentation of the original training data.

7. The non-transitory computer readable storage medium according to claim 6, further causes the computer to execute
performing processing of storing the reference feature value and the correct data of the original training data in the storage device, associating with each other.

8. The non-transitory computer readable storage medium according to claim 7, wherein
the learning learns a parameter of the second neural network based on an error between output data and correct data corresponding to the reference feature value, and the output data is output from the second neural network by inputting the reference feature value stored in the storage device to the second neural network.

9. A learning device comprising:
a processor configured to:
generate a first feature value and a second feature value by inputting original training data to a first neural network included in a learning model; and
learn a parameter of the first neural network, a parameter of a second neural network included in the learning model, a parameter of a decoder that inputs thereto the first feature value and the second feature value and reconstructs reconstruction data, and a reference feature value stored in a storage device, based on:
an error between the reconstruction data and the original training data,
an error between outputted data that is outputted from the second neural network that inputs thereto the second feature value and correct data of the original training data, and
an error between the second feature value and the reference feature value, wherein the reference feature value is used for learning the parameter of the second neural network when another training data is used for the learning model.

10. The learning device according to claim 9, wherein the processor is further configured to learn the reference feature value and the parameter of the first neural network based on an error between each of second feature values and the reference feature value, the second feature values are calculated by inputting a plurality of pieces of augmentation training data to the first neural network, and the plurality of pieces of augmentation training data is obtained by data augmentation of the original training data.

11. The learning device according to claim 10, wherein the processor is further configured to perform processing of storing the reference feature value and the correct data of the original training data in the storage device, associating with each other.

12. The learning device according to claim 11, wherein the processor is further configured to learn a parameter of the second neural network based on an error between output data and correct data corresponding to the reference feature value, and the output data is output from the second neural network by inputting the reference feature value stored in the storage device to the second neural network.

* * * * *